Dec. 18, 1928.
E. ROUČKA
1,695,471
AUTOMATIC LIQUID FEED REGULATOR
Filed April 20, 1925   2 Sheets-Sheet 1
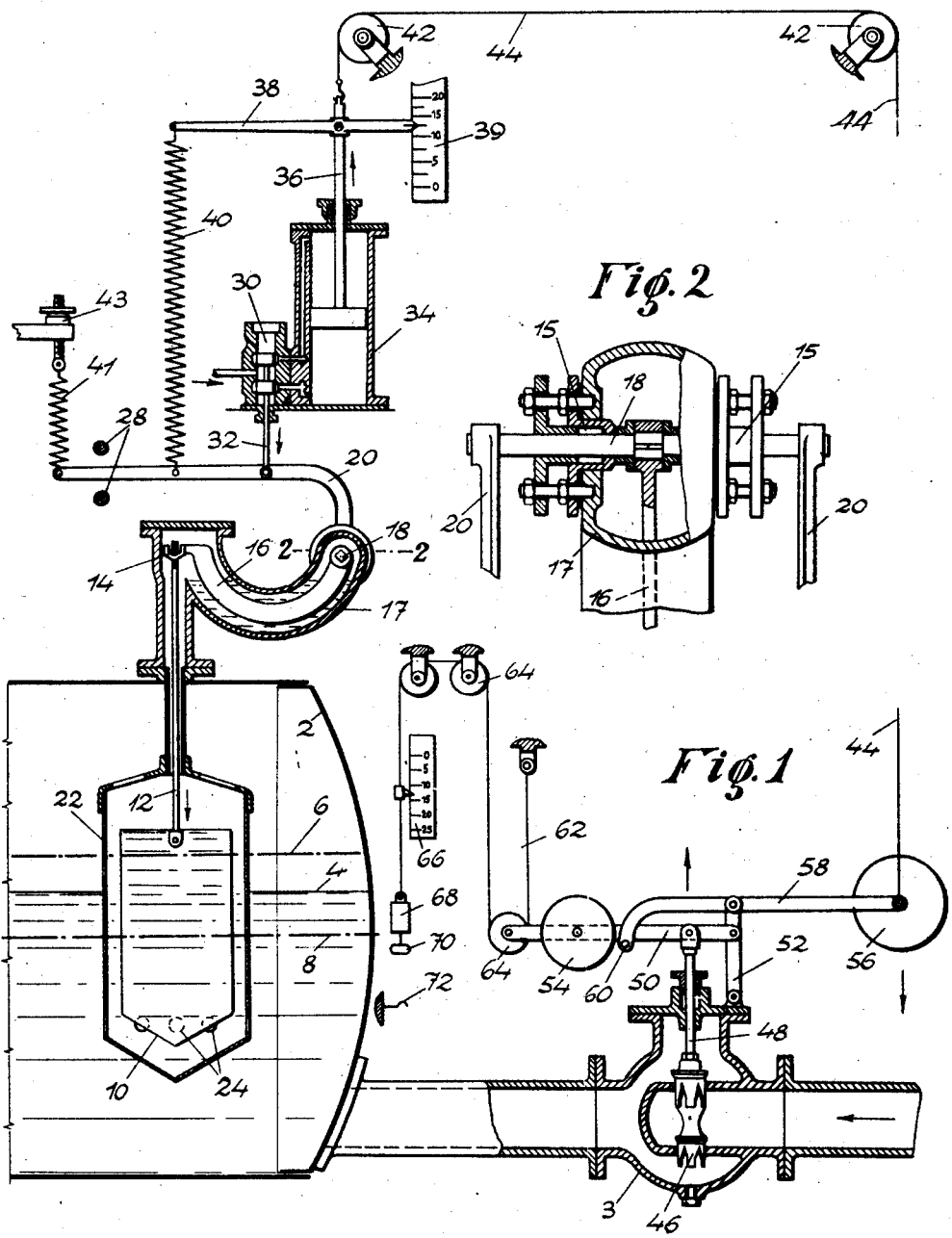
INVENTOR
ERICH ROUČKA
BY
Everett Cook,
ATTORNEYS.

Dec. 18, 1928.  1,695,471
E. ROUCKA
AUTOMATIC LIQUID FEED REGULATOR
Filed April 20, 1925  2 Sheets-Sheet 2
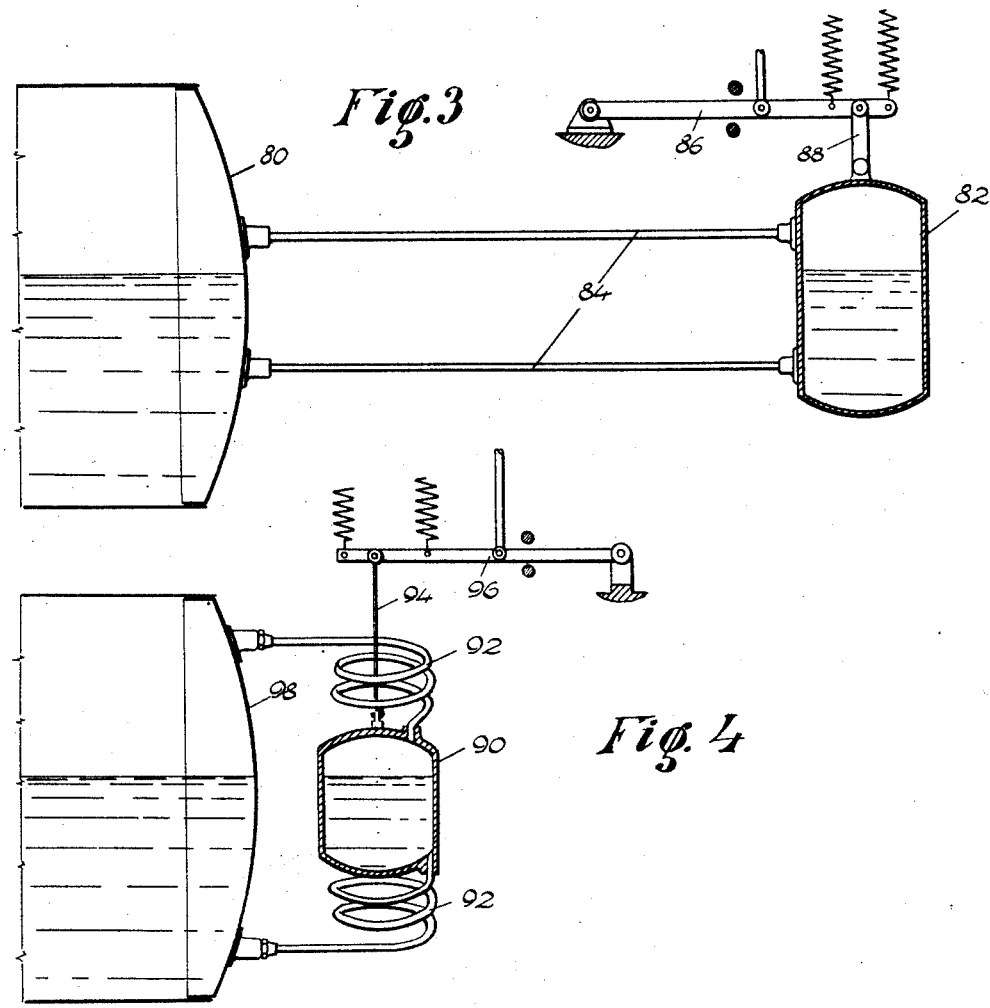
INVENTOR
ERICH ROUČKA
BY
ATTORNEYS.

Patented Dec. 18, 1928.

1,695,471

UNITED STATES PATENT OFFICE.

ERICH ROUČKA, OF BLANSKO, CZECHOSLOVAKIA.

AUTOMATIC LIQUID FEED REGULATOR.

Application filed April 20, 1925, Serial No. 24,630, and in Czechoslovakia May 13, 1924.

This invention relates to an automatic regulator for regulating the supply of liquids, especially feed water to steam boilers. The known regulating devices operated by a float or a thermostat provide comparatively little power for controlling operations, while those operating with a pilot motor are not sufficiently reliable and accurate, and are of complicated construction. The present invention consists in translating the varying water level in the boiler into a varying mechanical force, which is balanced by means including a spring or weight and a pilot motor which is controlled by this mechanical force and which at the same time modifies the rate of feed of liquid in accordance with the variations in the water level. The said mechanical force can be modified in accordance with the level of the water, either by means of a float arranged inside or outside the boiler, or by the use of vessels flexibly connected to and communicating with the boiler, the weight of which vessels and contents changes with the changes of water level inside the boiler, or by means of a thermostat or other device.

Referring to the accompanying drawings, in which corresponding and like parts are designated throughout the several views by the same reference characters, Figure 1 is a schematic sectional side elevation of apparatus embodying the invention;

Figure 2 is an enlarged sectional plan view on the line 2—2 of Figure 1, and

Figures 3 and 4 are fragmentary schematic sectional side elevations of modified forms of the invention.

In the boiler 2 is arranged a fixed protective casing 22, provided in its lower part with openings 24. A float 10 suspended under the influence of gravity on a lever 16 by means of a drawbar 12 and knife edge 14, is filled with water and is about half submerged in the water in the boiler 2 at mean water level 4. The water level when there is no load on the boiler is indicated at 6, while 8 denotes the water level when the boiler is under full load. The shaft 18 transmits the movement of the lever 16 outside the casing 17 to a lever 20. Movements of these levers are limited by two stops 28, and the levers actuate a governor or valve gear 30 of a pilot motor 34 by means of a drawbar 32. The weight of the float 10 or the influence of gravity thereon, is balanced by helical springs 40 and 41, the spring 41 being adjustable by any suitable means such as the adjusting device 43. By this adjustment, mean water level in the boiler 2 can be predetermined as desired. The spring 40 is connected to a crosspiece 38 which is mounted on the piston rod 36 of the pilot motor 34. The position of the piston rod can be read off accurately on a scale 39. The pilot motor 34 adjusts the water feed control valve 3 by means of a wire rope 44 passing over pulleys 42, and, by means of the arm 38 tightens or slackens the tension of the spring 40 engaging the lever 20.

The water feed valve consists of the valve casing 3 with a movable double-seated valve head 46. The valve heads are provided with cylindrical projections containing V-shaped slots. The characteristic of the regulation is determined, according to the type of the boiler, by the form and dimensions of these slots. The rod 48 of the valve head 46 is articulated to a lever 50, adapted to swing on a support 52 and provided with a weight 54 which influences the valve into closed position. A second lever 58, also articulated to the support 52 and provided with a weight 56, is actuated by the pilot motor 34 through the rope 44 connected to one end of said lever. The other end of this lever 58 is provided with a stop 60 against which bears the lever 50. The weight 56 being considerably heavier than the weight 54, the position of the lever 50 follows that of the lever 58, and the valve head 46 regulates the water feed in accordance with the position of the lever 58. When the piston rod 36 has reached the end of its inward stroke and the valve 3, 46 has been closed, the stop 60 moves a short distance away from the lever 50, and the weight 54 keeps the valve fully closed. By means of a fine wire cord 62, which is fastened at one end and passes over pulleys 64 to the indicator 66, the position of the valve head 46 at the moment is revealed to the fireman. The cord 62 is kept taut by a comparatively light weight 68. The fireman can also slip a handle 70 on the cord 62 over a hook 72, so as to cause the lever 50 to hold the feed valve 3, 46 fully open, without reference to the position of the lever 58, thus enabling automatic regulation to be replaced by hand regulation and vice versa.

The described regulator operates in the following manner. Assuming the withdrawal of steam to be increased, the original water level 4 gradually falls away from the float 10, which, therefore, due to its weight and the lessening of support provided by the water, descends and swings the levers 16 and 20. This at once actuates the governor 30 of the pilot motor 34 so that the piston rod 36 moves in the direction of the arrow, the end of the lever 58 with the weight 56 descends, and the stop 60 raises the lever 50 and opens the valve 3, 46 to admit feed water. At the same time the force of the spring 40 increases until it overcomes the increased weight of the float 10, thus influencing the float and the levers 16, 20 into their original positions. It will be evident that every level of the water in the boiler corresponds to a definite degree of aperture in the valve 3, 46. and therefore to a definite rate of feed. The valve 3, 46 will be moved toward closed position when the water in the boiler reaches the mean level 4, due to a reverse operation of the parts as the water rises to the mean level. At the maximum water level 6 the valve 3, 46 is completely closed, while at the level 8 the feed valve will be fully open. When the boiler load diminishes, the regulator operates reversely to that described to close the valve 3, 46.

Figure 2 shows a section through the casing 17, and the arrangement of the levers 16 and 20. The shaft 18, which is passed through two stuffing boxes 15, transmits the action of the lever 16 to the lever 20 outside.

Figure 3 shows another embodiment of the invention. In place of the float 10, suspended inside the boiler 2, a vessel 82 may be used, which communicates with the boiler 80 by means of long flexible tubes 84, so that the level of the water in the vessel 82 is always the same as that of the water in the boiler 80. The vessel 82 is suspended by means of a drawbar 88 on a lever 86, corresponding to the lever 20 of Figure 1, so that the vessel is influenced by gravity. The remainder of the arrangement is similar to that in Figure 1, except that in this case the regulator operates in such a manner that when the water level rises in the boiler 80, the vessel 82 and its contents of water grows heavier and vice versa, and consequently the arrangement of the lever of the valve 3 is reversed accordingly.

The vessel may also be suspended in other ways, such, for example, as shown in Figure 4, where the vessel 90 is connected to the boiler 98 by flexible helical tubes 92, the principle being really the same as that of the arrangement shown in Figure 3. The vessel 90 is suspended by means of a drawbar 94 from a lever 96 which discharges the same functions as the lever 20 in Figure 1.

It will be observed that the float 10 and the vessels 82 and 90 are all movably responsive to variations in the level of the liquid in the boiler, and each is movable by gravity the influence of which is varied by variations in the liquid level. Obviously, also, the response of the float 90 and the vessels 82 and 90 to gravity action, or the tendency to move under influence of gravity, produces mechanical forces in opposition to the forces exerted by springs 40 and 41.

What I do claim as my invention and desire to secure by Letters Patent is:—

1. Apparatus for regulating the supply of a liquid to a container, comprising means for controlling the supply of liquid to the said container, means movably responsive to variations in the level of said liquid for producing a mechanical force upon variations in the level of said liquid, means for producing a variable auxiliary force cooperating with said responsive means to balance the same, a governor actuated by and in accordance with departures from balanced relation of said responsive means and the balancing means due to variations in the level of liquid, a pilot motor controlled by said governor, and operative connections between said pilot motor and both said liquid supply controlling means and said balancing means to vary the supply of liquid and to vary said auxiliary force and restore said balanced relation of said responsive means and said balancing means.

2. Apparatus for regulating the supply of a liquid to a container, comprising means for controlling the supply of liquid to said container, a gravity movable means the effect of gravity upon which is varied by variations in the level of the liquid in said container, means for producing an auxiliary force to balance the influence of gravity upon said gravity movable means, a governor actuated by and in accordance with departures from balanced relation of said movable means and the balancing means, a pilot motor controlled by said governor, and operative connections between said pilot motor and both said liquid supply controlling means and said balancing means to vary the supply of liquid and to vary said auxiliary force and restore said balanced relation of said movable means and said balancing means.

3. Apparatus for regulating the supply of liquid to a container, comprising means for controlling the supply of liquid to said container, means movably responsive to variations in the level of the liquid in said container for producing a mechanical force upon variations in said level, two means cooperating with said responsive means for producing a variable auxiliary force to balance said responsive means, one of said balancing means being variable to produce a variable force, a governor actuated by and in accordance with departures from balanced relation of said responsive means and said balancing means due to variations in the level of the liquid, a pilot motor controlled by said governor, and operative connections between said pilot motor and both said liquid supply controlling means and said one of said two balancing means to vary the supply of liquid and to vary said auxiliary force and restore said balanced relation between said responsive means and said balancing means.

4. Apparatus for regulating the supply of liquid to a container, comprising means for controlling the supply of liquid to said container, means movably responsive to variations in the level of the liquid in said container for producing a mechanical force upon variations in said level, two springs, means for producing cooperation of said springs with said responsive means to balance the latter, a governor actuated by and in accordance with departures from balanced relation of said responsive means and said balancing springs, a pilot motor controlled by said governor, and operative connections between said pilot motor and said liquid supply controlling means and one of said springs whereby to vary the supply of liquid and to vary the tension of said spring to restore the balanced relation of said responsive means and said balancing springs.

5. Apparatus for regulating the supply of liquid to a container, comprising means for controlling the supply of liquid to said container, movable level responsive means the weight of which varies in accordance with variations in the level of the liquid in the container, means for producing a variable auxiliary force cooperating with said movable means to balance the same, a governor actuated by and in accordance with departures from balanced relation of said responsive means and the balancing means due to variations in the level of the liquid, a pilot motor controlled by said governor, and operative connections between said pilot motor and both said liquid supply controlling means and said balancing means to vary the supply of liquid and to vary said auxiliary force to restore said balanced relation of said responsive means and said balancing means.

6. Apparatus for regulating the supply of liquid to a container, comprising means for controlling the supply of liquid to said container, movable level responsive means the weight of which varies in accordance with variations in the level of the liquid in the container, two springs, means for producing cooperation of said springs with said responsive means to balance the latter, a governor actuated by and in accordance with departures from balanced relation of said responsive means and said balancing springs, a pilot motor controlled by said governor, and operative connections between said pilot motor and said liquid supply controlling means and one of said springs whereby to vary the supply of liquid and to vary the tension of said spring to restore the balanced relation of said responsive means and said balancing springs.

7. Apparatus for regulating the supply of liquid to a container, comprising means for controlling the supply of liquid to said container, a gravity movable vessel connected to said container so that the level of liquid in the vessel varies in accordance with the level in said container, means producing an auxiliary force cooperating with said vessel to balance the same, a governor actuated by and in accordance with departures from balanced relation of said vessel and the balancing means due to variations in the level of the liquid, a pilot motor controlled by said governor, and operative connections between said pilot motor and both said liquid supply controlling means and said balancing means to vary the supply of liquid and to vary said auxiliary force to restore said balanced relation of said vessel and said balancing means.

In testimony whereof I have hereunto set my hand.

ERICH ROUCKA.